(12) United States Patent
Martinez et al.

(10) Patent No.: US 7,783,624 B2
(45) Date of Patent: Aug. 24, 2010

(54) E-COMMERCE SYSTEM USING SEARCHABLE TAGS

(75) Inventors: Ronald G Martinez, San Francisco, CA (US); Chris Kalaboukis, Los Gatos, CA (US); Priyank Shanker Garg, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 327 days.

(21) Appl. No.: 11/949,396

(22) Filed: Dec. 3, 2007

(65) Prior Publication Data

US 2009/0144328 A1 Jun. 4, 2009

(51) Int. Cl.
*G06F 17/30* (2006.01)
(52) U.S. Cl. ...................................... 707/709
(58) Field of Classification Search ............... 707/2, 707/104.1, 709; 705/59; 709/203
See application file for complete search history.

(56) References Cited

OTHER PUBLICATIONS http://wiki.creativecommons.org/CcPublisher, License Your Work, CCPublisher, downloaded Nov. 30, 2007.

*Primary Examiner*—Etienne P LeRoux
(74) *Attorney, Agent, or Firm*—Baker Botts L.L.P.

(57) ABSTRACT

An infrastructure facility for interactive commerce in media objects over a network is described. Consumers are provided with searchable access to media object suppliers using standardized commercial packages. A commercial package is associated with a media object by using a commerce tag consisting of embedded metadata to identify the associated commercial package and optionally parameterize a commercial offer. The infrastructure facility provides a searchable database of available media objects with commerce tags, media object suppliers, and an accessible reference for commercial packages and associated tags.

24 Claims, 5 Drawing Sheets

E-COMMERCE SYSTEM USING SEARCHABLE TAGS

TECHNICAL FIELD

The present disclosure relates generally to commercial distribution of multimedia content over interactive networks, and particularly, to a mechanism for facilitating electronic commerce by attaching commercial transaction or other license packages to digital media objects using searchable tags.

BACKGROUND

As means of communication improve, users of communication devices have an increased ability to consume and disseminate information, and to interact over the network through the sharing of information. This disclosure relates generally to improved means of facilitating commercial exchanges of media objects among interconnected users over the network.

Modern communication networks are typically hierarchical transmission networks with multiple layers of transmission protocols. A transmission network is a system that allows two or more transceivers to exchange data, whereas a transmission protocol is a sequence of standard interactive steps that facilitate the exchange. Typically, the lowest level protocols are more concretely tied to the interaction of physical circuitry, whereas higher levels of protocols are more abstract to facilitate higher level processing at an algorithmic level. For example, in the vernacular "the web," also known as "the Internet," has become shorthand for a multi-layer computer communications system, which combines higher level protocols for access, mid-level protocols, such as a means of locating resources available on the network through a system of uniform resource locaters (URLs), and low-level hardware protocols which control the exchange of large, uneven blocks of data by breaking them into smaller, standardized packets. Users seek improved means to gather, transfer, and share multimedia information with other users, without the burden of managing lower-level protocols or learning new programming languages.

The network user perceives information conveyed through various forms of media objects, including text, icons, voice, audio recordings, pictures, animations, videos, interactive widgets, and other audiovisual information. Descriptions of one or more forms of media objects may be combined in a data object, which the consumer accesses over the network. The data object may contain additional "metadata" information which is not typically observed by the consumer, but may instead define parameters useful in conveying information related to the object, such as user identifiers, data locaters, data types, or data interpretation resources, as described below. Metadata may combine one of more specialized categories of metadata, such as a "meta identifier", a "meta keyword", a "meta URL", and so on.

Users communicating over a network typically use a physical device, such as a telephone, a text messenger, a cell phone, a personal digital assistant (PDA), a networked music/video player, a personal computer, or a public terminal, to interconnect with other users on the network. The shared information may be conveyed through various forms of media, including text, voice and audio recordings, pictures, animations and movie videos. Network users are able to perform social functions which are analogous to their real world counter-parts, such as to send and receive mail, to chat interactively, or to publish original works or compositions of other works, all in electronic form over the network. A network user utilizes a number of application programs to create or consume content on the network. Example application programs typically include a "media object player" and a "browser".

A browser is an application program that is generally intended to display "web pages." A web page is typically a two-dimensional image appearing as an individual page of information including one or more types of contained media objects. Multimedia content on the network appears in a virtual book format, which typically is displayed as an individually framed "web page" along with means for navigating to other related web pages. A web page may also be associated with consumer perceived audio output. Data for web pages is often described in a format known as a Document Object Model (DOM).

The multimedia content may be directly perceived on the web page or may be indirectly accessible. Content on the page may be directly perceived by including displayed images, videos, or a media object player rendered within the image of the page. Examples of indirect access include access to an audio recording through background music, access through an auxiliary page or pop-up window, access through an auxiliary program such as Microsoft's Windows Media Player®, or access provided through a link to another page. Many web pages incorporate one or more "hot links." The hot link enables a consumer to access another web page or another application by pointing to and clicking on the hot link using a computer input pointing device such as a mouse. Consumers typically have the ability to reject the web page or additional media offering(s) through controls in the browser user interface, such as by clicking on a "close box" using the mouse to remove or "close" a displayed window image.

A web page may include one or more HTML elements informally referred to informally as a "tag". More formally and syntactically, HTML elements are constructed with a plurality of metadata including a "start tag," zero or more attributes and their associated values, some amount of content, and an "end tag." Various HTML elements are predefined. For example, a media object consisting of an image may be described by the HTML image tag syntax, <img  src="http://www.myaol.com/images/beagle.jpg" alt="beagle, dog, hound"/>

In this example, the start tag "<img" denotes the beginning of an HTML element consisting of an image. The "src" attribute denotes the source or location of the image on the network, i.e. the network address of the image file associated with the URL, "http://www.myaol.com/images/beagle.jpg." Note that the local storage of data for the web page does not need to include the image file itself, but may instead include a reference to a remote file. The "alt" attribute provides alternative text in case the image cannot be displayed, which in this case is: "beagle, dog, hound." Finally, the end tag "/>" denotes the end of the HTML element. Informally, common usage in the art refers to such an example as an image embedded via an HTML tag.

A network user may also become a composer to create new web pages. The DOM for a web page is typically stored in a data file using a common programming language, such as Hyper Text Markup Language (HTML). The composer may compose the web page directly by creating a description in the common programming language, or may compose the web page indirectly using an application program to combine text descriptions and other media into a page description in HTML or another suitable language. A composer may further combine one or more web pages to create a "website." A website may be self-contained, in that it consists solely of web pages created for that site and a means for navigating among the contained web pages. More commonly, a website contains a combination of composer-generated content as well as links to other content or applications on the web. Typically, the composer may review a new web page or website composition on his computer using his browser.

The composer may also disseminate the new web page or website to other users on the network by publishing his page description(s) on a "web server", where a web server is a server connected to the communications network that will provide published web pages in response to requests from authorized users on the network. To use the web server to publish a page, the composer typically registers with a service provider, such as Yahoo!, Inc. of Sunnyvale, Calif., to use a service called Yahoo! GEOCITIES™, Composers who wish to enhance a web page with media content other than text typically complete a cumbersome process of locating and incorporating the content. When the web page(s) are published, the composer and service provider may be exposed to legal liability for incorporating copyrighted or inappropriate content. Although the composer or service provider could potentially license the incorporated content, transaction costs may be too high for individual composers.

As mentioned previously, a consumer may also use an auxiliary program to perceive media objects, such as the Windows Media Player®, available from Microsoft Corporation of Redmond, Wash., the RealPlayer® from RealNetworks, Inc. of Seattle, Wash., or the QuickTime® player from Apple Computer Inc. of Cupertino, Calif. Each of these players is able to process a variety of data file formats describing media objects. Example data file formats include JPEG, TIFF, or PIC format data files for photographs, WAV, MP3, or AIFF format data files for audio recordings, and AVI, MPEG, or H.264 format data files for video recordings. The consumer typically locates and accesses a media object described in a suitable format for his or her auxiliary program. If the media object is not directly available in a suitable format, the consumer may convert the media object file format to a suitable format using conversion software, such as Harmony Technology® from RealNetworks, Inc.

A browser may also support one or more plug-ins. A plug-in operates within the context of an existing web browser. The plug-in is operative to functionally replace, augment, or modify the functionality of the browser, to enable one or more program steps to be performed in the browser environment. Plug-ins may also represent an alternative way for a consumer to access a stand-alone software application. For example, Yahoo! Instant Messenger© is available as a stand-alone client application program that allows two or more networked users to chat interactively over the network. The Instant Messenger client application is also available as a plug-in to run in a browser window.

A further feature of HTML tags is the ability to invoke remote programs. For example, an HTML tag embedding a digital video may invoke an external media object player, a browser plug-in, a web-based user application, or a web-based network service to decode and render the video. Further, HTML code tags may be nested to provide a plurality of application functions. A consumer accessing an HTML web page containing a reference to a digital video, for example, may activate HTML tags to invoke a local digital video player application as a browser plug-in, to invoke transmission of a request for a streaming digital video file to a media file server, and to receive the transmission, decode it, and render it on his computer.

When multimedia content for the network has been created, the creative work may be distributed by posting it on the network, using, for example, a web server or a content aggregation website. Various rights to the creative work may be licensed or assigned. For example, the creator of the work may retain a right of attribution and a degree of control over derivative works, while a distributor might have the right to a share of revenue from distribution of copies of the work. Further, a creative work may be made available for reuse by a third party. The third party may desire, for example, to republish the work, redistribute the work, attach advertising to the work, or incorporate the work in a derivative work.

A work is made available for republication by others through a variety of methods. The work may be marked as available by designating a license authorizing such secondary and tertiary use, such as a Creative Commons or other license. A work may also be syndicated using an RSS feed, the result of which may by embedded into a second site by a second user for viewing by a third user. RSS is a family of web feed formats for streaming media, including the Really Simple Syndication format (RSS 2.0), the RDF Site Summary format (RSS 1.0 and 0.90), and the Rich Site format (RSS 0.91). A work posted on a server website may also be searched for and found, and embedded in a second site through a URL reference to the server website. A work found by a search engine may also be cached in a search engine server, and presented as an excerpt along with links to the original work in a search result.

Network users spend a lot of time to navigate the network to search for multimedia content to exploit commercially. Potentially valuable content is developed daily on a massive scale by millions of content creators publishing on millions of websites. Unfortunately, there is no simple way to associate business terms with the content governing its commercial use on second sites, including rights and revenue generating methods that result in monetary or other benefit to the content creator or original distributor. There is a need to provide an infrastructure for web content commerce with the means to locate and access creative works, to facilitate content-related transactions, and render more of the value of the creative works at a speed and scale appropriate for the Internet.

SUMMARY

An infrastructure facility for interactive commerce in media objects over a network is described. Consumers access the commerce system provider to locate media objects and media object suppliers using standardized commercial licensing packages. A commercial package is associated with a media object using a commerce tag consisting of embedded metadata. The commerce tag identifies the associated commercial licensing package and optionally parameterizes a commercial agreement. The infrastructure facility provides a searchable database of available media objects, media object suppliers, and an accessible reference for commercial packages and associated tags.

DETAILED DESCRIPTION

The following embodiments and aspects thereof are described and illustrated in conjunction with systems, apparatuses and methods meant to be exemplary and illustrative, not limiting in scope. In various embodiments, one or more of the above-described problems have been reduced or eliminated.

The following description sets forth numerous details to provide a thorough understanding of various aspects of the present invention. It will be apparent to those skilled in the art, however, that the present invention may be practiced without these specific details. In other instances, algorithms for processing data and symbolic representations of algorithmic operations are the means used by those skilled in the art to most effectively convey the substance of their work to others skilled in the art. An algorithm, as used herein, is a sequence of operations leading to a desired result, said operations requiring physical manipulations of physical quantities. Usually, though not necessarily, these quantities take the form of a sequence of electrical signals representing binary numbers to be stored, transferred, combined, compared, and otherwise manipulated.

The present invention also relates to apparatus for performing the operations herein. This apparatus may be specially constructed for the required purposes, or it may comprise one or more general-purpose computers selectively activated by one or more computer programs to achieve the required results. Such a computer program may be stored in any suitable computer-readable storage medium. A computer-readable storage medium includes any mechanism for storing or transmitting information in a form that is usable by a machine, such as a general-purpose computer.

The algorithms and displays presented herein are not inherently related to any particular computer or other apparatus. Various general-purpose systems may be used in accordance with the teachings herein, and it may prove expedient to construct more specialized apparatus to perform the algorithm operations. The required structure for a variety of these systems may appear from the description below. In addition, the present invention is not described with reference to any particular programming language. Those skilled in the art will appreciate that a variety of programming languages may be used to implement the teachings of the invention as described herein.

Figure 1:
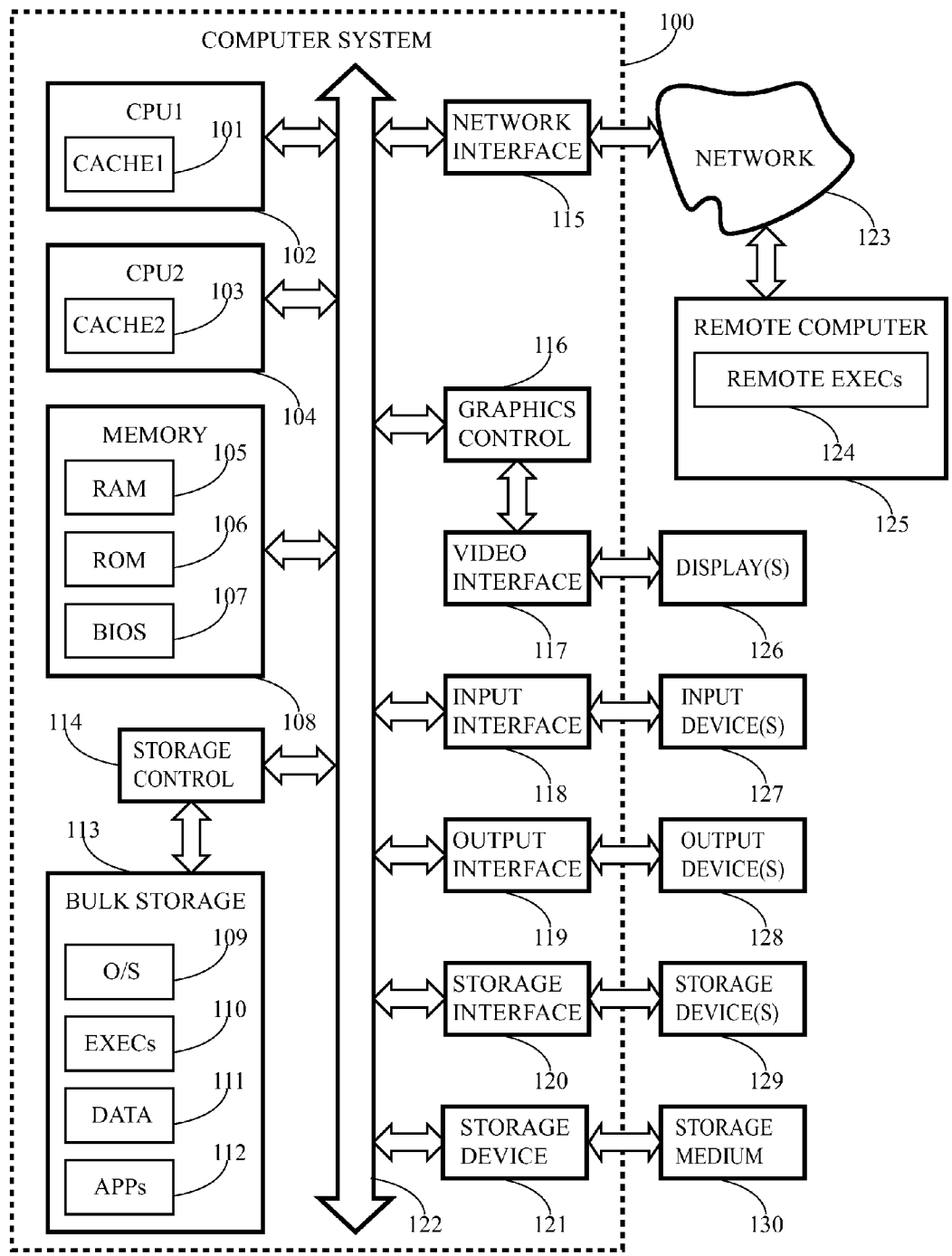
FIG. 1 is a block diagram of example computer system architecture.

Server and client systems described herein can be implemented by a variety of computer systems and architectures. FIG. 1 illustrates suitable components in an exemplary embodiment of a general-purpose computer system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computer system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general-purpose computer system 100. Computer system 100 accesses one or more applications and peripheral drivers directed to a number of functions described herein. Components of the computer system 100 may include, but are not limited to, a CPU or central processing unit 102, a system memory 108, and a system bus 122 that couples various system components including the system memory 108 to the processing unit 102. As used by those skilled in the art, a signal "bus" refers to a plurality of digital signal lines serving a common function. The system bus 122 may be any of several types of bus structures including a memory bus, a peripheral bus, and a local bus using any of a variety of bus architectures. By way of example, and not limitation, such architectures include the Industry Standard Architecture (ISA) bus, Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

An operating system manages the operation of computer system 100, including the input and output of data to and from applications (not shown). The operating system provides an interface between the applications being executed on the system and the components of the system. According to one embodiment of the present invention, the operating system is a Windows® 95/98/NT/XP/Vista/Mobile operating system, available from Microsoft Corporation of Redmond, Wash. However, the present invention may be used with other suitable operating systems, such as an OS-X® operating system, available from Apple Computer Inc. of Cupertino, Calif., a UNIX® operating system, or a LINUX operating system.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, random access memory (RAM), read-only memory (ROM), electrically erasable programmable ROM (EEPROM), flash memory or other memory technology, compact-disk ROM (CD-ROM), digital versatile disks (DVD) or other optical disk storage, magnetic tape cassettes, magnetic tape, hard magnetic disk storage or other magnetic storage devices, floppy disk storage devices, magnetic diskettes, or any other medium which can be used to store the desired information and which can accessed by the computer system 100.

Communication media may also embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared, cellular networks, and other wireless media.

The system memory 108 includes computer storage media in the form of volatile and/or nonvolatile memory such as read only memory (ROM) 106 and random access memory (RAM) 105. A basic input/output system 107 (BIOS), containing the basic routines that help to transfer information between elements within computer system 100, such as during start-up, is typically stored in ROM 106 and other nonvolatile storage, such as flash memory. Additionally, system memory 108 may contain some or all of the operating system 109, the application programs 112, other executable code 110 and program data 111. Memory 108 typically contains data and/or program modules that are immediately accessible to and/or presently being operated on by CPU 102. Optionally, a CPU may contain a cache memory unit 101 for temporary local storage of instructions, data, or computer addresses.

The computer system 100 may also include other removable/non-removable, volatile/nonvolatile computer storage media. By way of example only, FIG. 1 illustrates a bulk storage device 113 that reads from or writes to one or more magnetic disk drives of non-removable, nonvolatile magnetic media, and storage device 121 that may be an optical disk drive or a magnetic disk drive that reads from or writes to a removable, a nonvolatile storage medium 130 such as an optical disk or a magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. Bulk storage device 113 and the storage device 121 may be connected directly to the system bus 122, or alternatively may be connected through an interface such as storage controller 114. Storage devices may interface to computer system 100 through a general computer bus such as 122, or may interconnect with a storage controller over a storage-optimized bus, such as the Small Computer System Interface (SCSI) bus, the ANSI ATA/ATAPI bus, the Ultra ATA bus, the FireWire (IEEE 1394) bus, or the Serial ATA (SATA) bus.

The storage devices and their associated computer storage media, discussed above and illustrated in FIG. 1, provide storage of computer-readable instructions, executable code, data structures, program modules and other data for the computer system 100. In FIG. 1, for example, bulk storage device 113 is illustrated as storing operating system 109, application programs 112, other executable code 110 and program data 111. As mentioned previously, data and computer instructions in 113 may be transferred to system memory 108 to facilitate immediate CPU access from processor 102. Alternatively, processor 102 may access stored instructions and data by interacting directly with bulk storage device 113. Furthermore, bulk storage may be alternatively provided by a network-attached storage device (not shown), which is accessed through a network interface 115.

A user may enter commands and information into the computer system 100 through the network interface 115 or through an input device 127 such as a keyboard, a pointing device commonly referred to as a mouse, a trackball, a touch pad tablet, a controller, an electronic digitizer, a microphone, an audio input interface, or a video input interface. Other input devices may include a joystick, game pad, satellite dish, scanner, and so forth. These and other input devices are often connected to CPU 102 through an input interface 118 that is coupled to the system bus, but may be connected by other interface and bus structures, such as a parallel port, a game port or a universal serial bus (USB). A display 126 or other type of video device may also be connected to the system bus 122 via an interface, such as a graphics controller 116 and a video interface 117. In addition, an output device 128, such as headphones, speakers, or a printer, may be connected to the system bus 122 through an output interface 119 or the like.

The computer system 100 may operate in a networked environment using a network 123 to one or more remote computers, such as a remote computer 125. The remote computer 125 may be a terminal, a personal computer, a server, a router, a network PC, a peer device or other common network node, and typically includes many or all of the elements described above relative to the computer system 100. The network 123 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 124 as residing on remote computer 125. It will be appreciated that the network connections shown are exemplary and other means of establishing a communications link between the computers may be used.

Collectively, these elements are intended to represent a broad category of computer systems, including but not limited to general purpose computer systems based on one or more members of the family of CPUs manufactured by Intel Corporation of Santa Clara, Calif., the family of CPUs manufactured by Advanced Micro Devices (AMD), Inc., of Sunnyvale, Calif., or the family of ARM CPUs, originally designed by Advanced RISC Machines, Ltd., as well as any other suitable processor. Of course, other implementations are possible. For example, the server functionalities described herein may be implemented by a plurality of server sub-systems communicating over a backplane.

Various components of computer system 100 may be rearranged, deleted, or augmented. For example, system bus 122 may be implemented as a plurality of busses interconnecting various subsystems of the computer system. Furthermore, computer system 100 may contain additional signal busses or interconnections between existing components, such as by adding a direct memory access unit (not shown) to allow one or more components to more efficiently access system memory 108.

As shown, CACHE1 and CPU1 are packed together as "processor module" 102 with processor CPU1 referred to as the "processor core." Alternatively, cache memories 101, 103, contained in 102, 104 may be separate components on the system bus. Furthermore, certain embodiments of the present invention may not require nor include all of the above components. For example, some embodiments may include a smaller number of CPUs, a smaller number of network ports, a smaller number of storage devices, or a smaller number of input-output interfaces. Furthermore, computer system 100 may include additional components, such as one or more additional central processing units, such as 104, storage devices, memories, or interfaces. In addition, one or more components of computer system 100 may be combined into a specialized system-on-a-chip (SOC) to further system integration. In some computer system environments where component count is critical, the entire computer system may be integrated in one or more very large scale integrated circuit(s).

As discussed below, in one implementation, operations of one or more of the physical server or client systems described herein is implemented as a series of software routines executed by computer system 100. Each of the software routines comprises a plurality or series of machine instructions to be executed by one or more components in the computer system, such as CPU 102. Initially, the series of instructions may be stored on a storage device, such as bulk storage 113. However, the series of instructions may be stored in an EEPROM, a flash device, or a DVD. Furthermore, the series of instructions need not be stored locally, and could be received from a remote computer 125 or a server on a network, via network interface 115.

Figure 2:
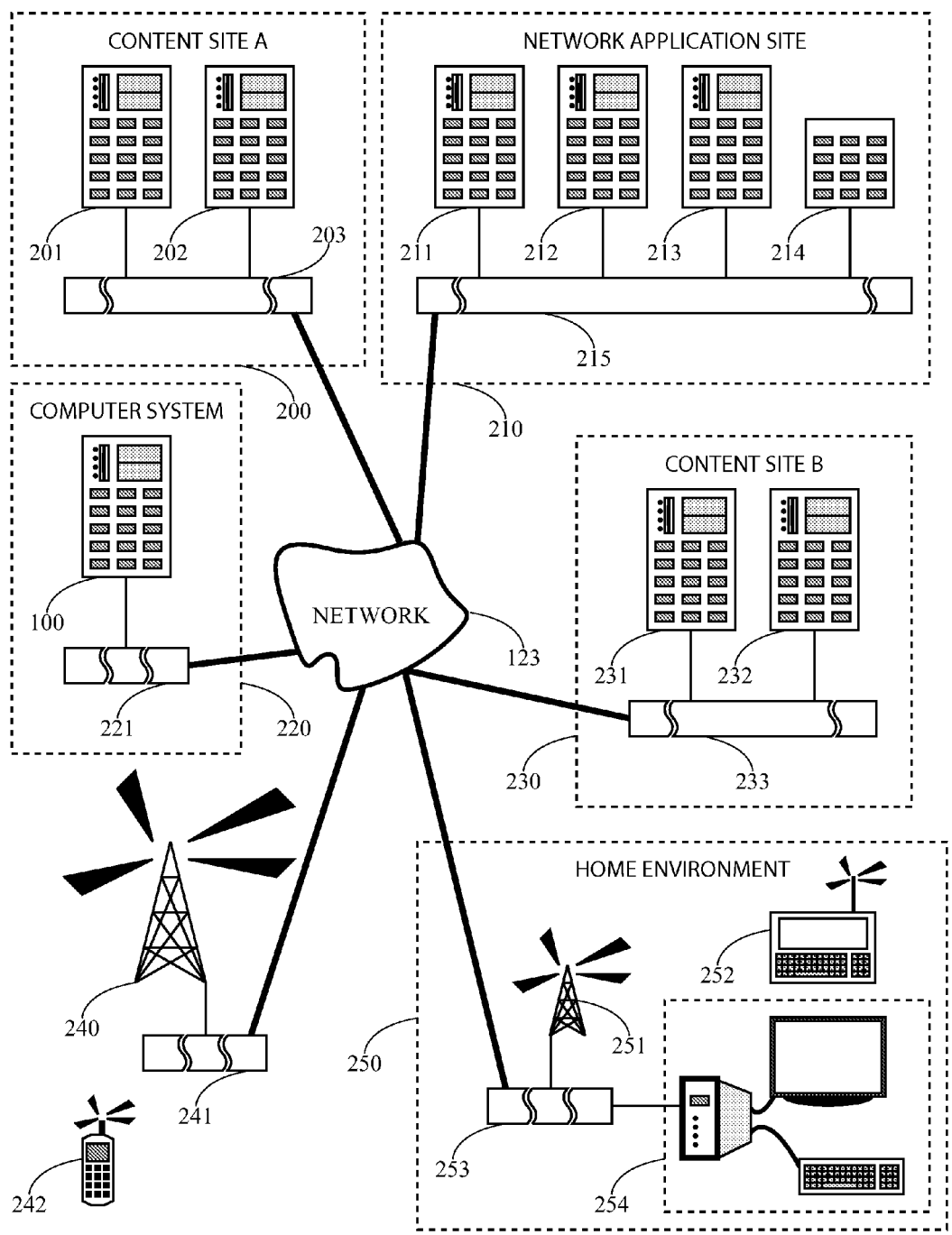
FIG. 2 illustrates an example network environment.

FIG. 2 illustrates computer system 100 placed in an example wide area network environment, such as the Internet. Network cloud 123 generally represents one or more interconnected networks, connecting computer system 100, a plurality of network sites, 200, 210, 220, 230, 240, and 250, and a plurality of client devices, 242, 251, 252, and 254. Network cloud 123 may include TCP/IP based wide area networks, private networks, wireless networks, satellite networks, cellular networks, paging networks, and the like. Client systems, such as portable device 242, portable computer 252, and personal computer 254 are operably connected to the wide area network environment through an internet service provider (not shown), a cellular provider 240, a wireless provider (not shown), a local wireless network 251, and/or a local wired network 253.

Computer system 100 is contained within the network site 220, where one or more computer systems, such as computer system 100, are connected to a local area network and router 221. The router 221 manages local computer communication traffic in network site 220 and interconnects with network cloud 123. Router 221 also functions to translate one or more local area network addresses in network site 220 to provide one or more unique corresponding wide area network addresses in order to facilitate communication between computer systems in network site 220 and other computer systems on the wide area network.

FIG. 2 illustrates a number of network service provider sites, including content site A 200, content site B 230, and network application site 210. The described invention may operate with one or more content providing or application sites. Although FIG. 2 illustrates the provider sites as separate local network sites, the functionality of each site may be combined with other sites. Further, a function for a particular site may be performed in a distributed computing environment by one or more computer systems at remote sites. Further still, the functionality represented by each depicted site may be further separated into a plurality of sub-function sites. In addition, implementations of the invention may operate in network environments that include multiples of one or more of the individual sites or subsystems of sites described herein. Implementations of the invention may also operate in network environments where one of more of the systems or sites described herein has been eliminated.

Content aggregation sites are represented by content site A 200 and content site B 230 in FIG. 2. Content is stored as one or more digital data objects. A digital data object may include one or more media objects or executable code objects. Content site A 200 is a network addressable system that allows users to access media objects supplied by one or more users. In one implementation, content site A 200 may be a media object aggregation or sharing system, such as Yahoo! FLICKR™ photo sharing site, and similar variants. Content site A 200 comprises one or more physical server systems 201, 202, implemented using an architecture such as that of computer system 100, and containing or connected to one or more bulk storage systems, such as that of bulk storage system 113, or a network attached storage device (not shown), and a local area network and router 203. The one or more physical servers allow users to upload and download media objects. In one implementation, the functionality hosted by the one or more physical servers may include web or HTTP servers, FTP servers, and the like.

Content site B 230 is a network addressable system that allows users to access content supplied by one of more content suppliers (not shown). Content site B 230 comprises one or more physical server systems 231, 232 containing or connected to one or more bulk storage systems (not shown), and a local area network and router 233. The one or more physical servers 231, 232 allow the service provider (not shown) to serve web pages containing a plurality of media objects. The media objects may be stored in Content Site B, or Content Site B may remotely access another network addressable system, such as Content Site A, to retrieve the media object.

Network application site 210 is a network addressable system that allows users to access one or more executable code objects. Network application site 210 comprises one or more physical server systems 211, 212, 213 containing or connected to one or more storage systems, shown as network-attached storage device 214, and a local area network and router 215. Executable code objects may include code to be executed on a client device as well as code executed within a server system, such as server 212. An example of an executable code object is an informational web site where users request and receive identified web pages and other content over the network cloud 123. The executable code object may also be a posting forum, where users may submit or otherwise configure media objects to be perceived by other users. The executable code object may also be a social network application, such as a chat client or e-mail client, adapted to establish intermediated or peer-to-peer communications with other clients. The executable code object may also be a web-posting application, allowing users to configure and maintain personal web pages. One or more executable code objects may also combine to form a content distribution application that displays available media objects and transmits them to users. Examples of network application sites include Yahoo! Music Engine®, Apple iTunes®, and podcasting servers.

In media object aggregation or sharing systems, such as the Yahoo! FLICKR™ photo sharing site, media objects are typically contained in data objects which also contain metadata related to the media object. For example, a data object containing a media object may also contain one or more meta keywords or tags to identify the subject of the media object. A photo sharer may upload a photo to a photo sharing site, and consider the photo related to a set of keywords, such as "artists," "musicians," "drummers," and "teen-idols." The photo sharer may further configure the media object by combining the media object with the set of related meta parameters in a data object.

In the context of a computer network, a "virtual server" is physically one or more server systems connected to the network and support circuitry to execute application programs which process data. Data may be stored by means which facilitate efficient processing, such as by storing the data in a "database" consisting of a collection of data organized by relationships between the various forms of data contained therein. When a virtual server consists of more than one computer server system, the set of computer server systems is interconnected hierarchically to perform high-level functions as combined functions of several servers under central control.

Functionally, a virtual server executes a sequence of low-level CPU commands to complete instructions for processing data. A virtual server typically accepts instructions and executes commands for a multitude of "clients". The instructions may include, but are not limited to, instructions to store or retrieve data, to modify, verify or erase data, or to reorganize data. A virtual server may also initiate instructions for other network-attached devices. For example, a virtual "music server" might maintain a database to locate a library of musical compositions. The music server might receive commands to store new songs or retrieve old ones from a number of clients. Further, the music server might send commands to other devices on the network, e.g., to disseminate the musical database among various subservient servers, such as a "jazz server," a "hip-hop server," a "classical server," and so on, to register paying user requests in a "billing server," to verify the identity, preferences, and access privileges of a user in a "registration server" and so on. The music server may therefore also be a client of other servers. Practitioners of the art will recognize that virtual servers and clients are abstract interactive devices controlled by software instructions, whose interaction protocols may be flexibly defined. A "client" as used herein may include functionally to process information and programs, as well as to issue commands. Similarly, a virtual server as used herein may include functionally to initiate commands to users and other servers as well as to respond to instructions.

Similarly, a database should not be construed to be a single physical collection of data. As used herein, a database is an abstract collection of data which may be distributed over one or more physical locations. Said data may be stored physically within a single or multiple servers, within attached physical device(s), network attached device(s), or user devices(s). Similarly, an application program should not be construed to be a single physical collection of commands. As used herein, an application program is an abstract collection of CPU commands, which may be physically executed, in whole or in part, within a single or multiple servers, within attached physical devices(s), within network attached device(s), or within user device(s).

Figure 3:
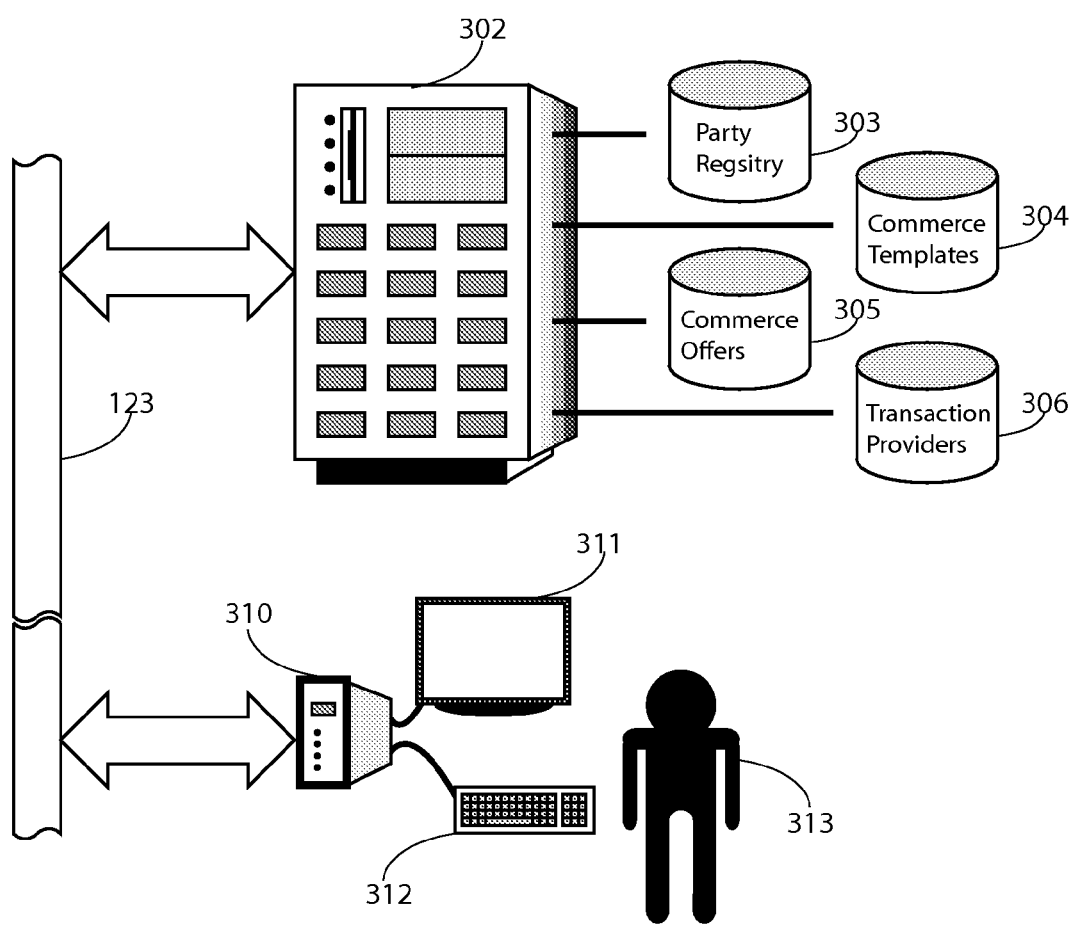
FIG. 3 illustrates an example client-server system for service registration.

FIG. 3 illustrates a client-server system, where a commerce system provider interacts with a plurality of users. User 313 is able to communicate over the network 123 through the use of a network client application, such as a web browser. User 313 typically has a network access device 310, such as a computer, a text input device 312, such as a keyboard, and observes a two-dimensional display 311, such as a monitor. The commerce system provider operates a virtual registration server 302 over the network 123 which maintains a registration website (not shown), an owner registry database 303, a commerce agreement template database 304, a commerce offers database 305, and a transaction service provider database 306, as explained in more detail below. Server 302 is operative to register new users, to provide a set of standardized commerce agreement offers, to represent the commerce agreement offers by generating standardized commerce tags, and to provide a means to search for media objects with the standardized commerce tags on the network.

Server 302 implements a registration process which may include one or more of (a) determining whether the user is a new or a returning user, (b) authenticating the returning users, and (c) maintaining a database of user attributes in a party registry 303.

For media object supplying users, the registration process may include one or more of (a) maintaining a user accessible database of commerce templates 304, (b) an interactive application to select a commerce template and input parameters for the selected commerce template, (c) storage of the parameterized commerce template as a commerce offer in database 305, and (d) generation of a unique identifier and commerce tag for the stored parameterized commerce template.

Media object consuming users access the database of commerce offers 305 to identify a media object of interest and complete a media object transaction. A media object consumer is able to search the database of commerce offers using keywords to find references to media objects commercially available to be licensed. The commercially available media objects are accessible on the network and may be stored on an owner's remote host, on a third-party remote host, or on a server affiliated with the commerce system provider. In one implementation, an offered media object is stored on a remote server, a commerce offer in server 302 specifies the network location of the relevant media object, and the media object supplier may optionally configure the network location of the media object.

In an alternative implementation, an offered media object is posted on a website hosted by a remote server, and the offered media object is discovered by web crawling and/or other network discovery techniques. For example, the offered media object may be discovered by the commerce system provider's web crawler, executed on server 302, by analyzing the content of a posted website accessible on the network, and discovering one or more commerce tags embedded in the website metadata. Media object offerings discovered in the web-crawling process populate the commerce system databases as shown in the example flowchart of FIG. 5.

Figure 5:
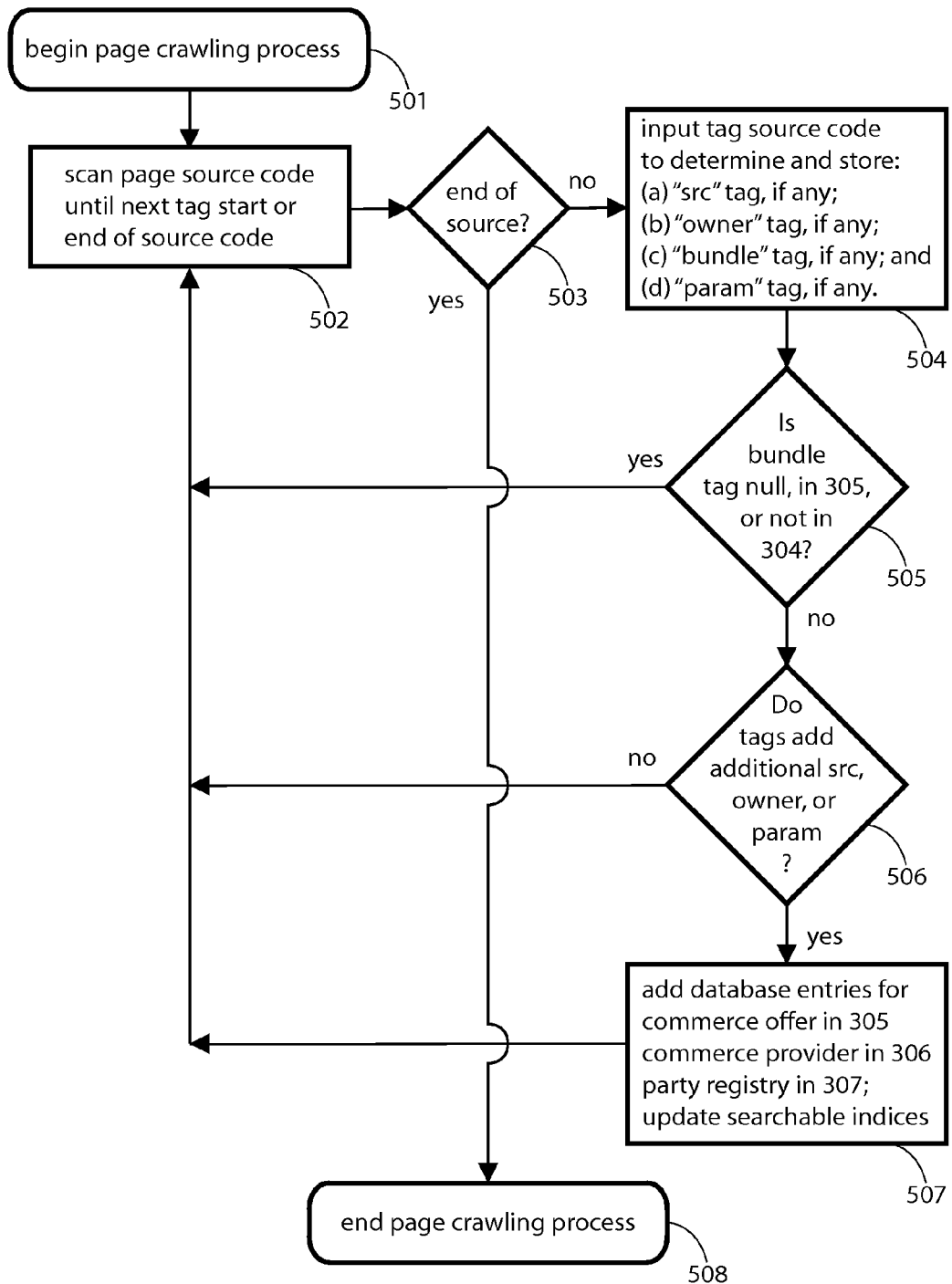
FIG. 5 is a flowchart for an example page crawling process.

Referring to FIG. 5, it is assumed that a web crawler program executed on server 302 has accessed a web page on the network, and begins the process of analyzing the page for commerce tags in step 501. The page source code is preferably loaded into a cache memory, which is scanned until the end of the source code is reached or until the start of the first tag in the source code is encountered. Step 503 checks if the end of source code has been reached, and if so, all commerce tags have been processed and the page crawling process terminates in step 508.

If the end of source code has not been reached, step 503 proceeds to step 504, where the tag source code is analyzed. The tag source code is parsed into relevant fields. If a field of the form "src=X" is found, the location of the media object is assumed to be the URL X; otherwise the "src" field is considered null. Similarly, an "owner" "bundle" or "param" tag is assigned if found and is otherwise null. After the tag source code is analyzed, step 504 proceeds to step 505.

Step 505 checks to see if the bundle tag is null, is already in the database 305, or is not in the database 304. If the bundle tag is null, the tag source code does not define a commerce bundle. If the bundle tag is in the commerce offers database 305, the bundle tag represents a parameterized commerce offer already registered in the database. If the bundle tag is defined, but not in database 305, it is expected to match an archetypical commerce offer in the commerce template database 304. If so, step 505 proceeds to step 506; otherwise, the bundle tag is unrecognized. Processing is complete for a null, unrecognized, or already registered bundle tag, and the flowchart returns to step 502 to look for the next commerce tag.

If the commerce tag is in 304, however, step 506 checks if the additional fields supply an additional source identifier, owner, or relevant parameter to fill in a missing term in the archetypical commerce offer specified by the commerce bundle field. If not, all offer terms are explicit in or implied by the archetypical offer, and the flowchart returns to step 502 to look for the next commerce tag.

However, if the additional fields supply an additional source identifier, owner, or relevant parameter as a missing term in the archetypical commerce offer, a modified commerce offer is dynamically generated to incorporate the one or more missing terms. The database of commerce offers 305 is checked to see if the modified commerce offer is already included, and if not, the modified commerce offer is registered in commerce offer database 305, and relational entries in the transaction provider database 306 and party registry 307 are updated, as well as corresponding entries in the searchable indices of server 302. The flowchart proceeds to step 502 to look for the next commerce tag. The flowchart proceeds in this manner until all tags are exhausted and the end of page source code is found.

In one implementation, the owner of a media object may optionally configure a commercial offer with an authentication mechanism, such as a digital signature combinatorially derived from the data of the media object. In an alternative implementation, a media object discovered in web crawling is further analyzed to determine an associated digital signature. The digital signature is stored along with the discovered media object commerce offer. The digital signature and/or other authentication mechanism provides a means to ensure that a later retrieved media object is an authentic copy, not corrupted, and complete. When a media object is transferred, a digital signature of the transferred object should match the reference digital signature in commerce offer database 305.

In order to complete a transaction, server 302 maintains a database of transaction service providers 306. A media object supplier may optionally specify a preferred financial institution or financial network service provider to provide for remission of licensing fees. Additionally, a commerce bundle may be associated with a transaction service provider, the transaction service provider facilitating financial transactions specified by the bundle. In one implementation, server 302 is operative to maintain the transaction service provider database 306 in order to store the required financial service provider parameters and codes to dynamically generate commands to transfer funds. In another implementation, server 302 dynamically generates remote commands for the transaction service provider and optionally stores information concerning a consuming party in party registry 303 to facilitate future transactions.

In one implementation, server 302 relies on the transaction service provider to complete the transaction. Database 306 stores the required financial service provider parameters and codes to dynamically generate a transaction request, and, in one implementation, forwards the consuming user with the request to the financial service provider. In a preferred implementation, each bundle has an associated transaction service provider implementing the commercial workflow, and the commerce system provider is more of a passive database reference. The transaction service provider is preferably able to process commerce tags without additional commands. A user obtains the media object by interacting with the commerce system provider to identify the transaction service provider, referenced by URL in the transaction service provider database 306. The transaction service provider is able to read the media object's commerce tag, and query the commerce system provider to determine the terms of the offer, to identify the recipient of licensing fees and the recipient's financial institution. In response to a request for a transaction, the transaction service provider accepts payment, acknowledges payments by posting an update to the owner's attributes in owner registry 303 of commerce system provider server 302, and initiates transfer of the media object (if required) by providing a media object server access code or a service request to a remote media object server.

In an alternate implementation, server 302 is operative to respond to a completed transaction by retrieving a data object containing the media object from a remote server and transmit the data object to the consumer. In an alternate implementation, server 302 is operative to dynamically generate and forward a request for the media object from a commerce provider in database 306. In a third alternative implementation, server 302 is operative to provide the relevant information to the consumer to facilitate completion of a private transaction between the owner and consumer.

In FIG. 3, the party registry database 303 contains a registry of media object right(s) owners. Each owner is assigned a unique owner identifier (owner-ID). Contact information and transaction account information may also be stored in the owner registry to facilitate financial transactions related to the owned media object rights. In one implementation, the contact and transaction account information is subject to one or more authenticating mechanisms, such as account or address verification techniques employed by the financial services industry, to protect sensitive owner information.

The commerce templates database 304 is a collection of standardized media object usage agreement templates. A usage agreement template contains a commerce bundle consisting of one or more potential usage agreement contract offers. The terms of an offer provide a specification of the rights that may be extended via license in the commercial system, as well as any restrictions on use and obligations of the licensee to the owner. A contract offer is completed by filling in the missing terms and attaching the offer to a media object.

An example standardized template may be referred to as a "PreviewPlusBuyOption" bundle. A preview is typically a first media object that allows a user to sample a second media object, where the first media object is sufficient to portray the subject of the media object but with insufficient detail to be of significant commercial value. If the media object is a two-dimensional graphic image, for example, an owner typically creates a full-scale, high-resolution image but a preview image consists of a smaller, lower-resolution version. If the media object is a digital audio file corresponding to a song, for example, a preview may consist of a short encoded excerpt of the song. Typically, the user may access the preview for free, but must complete a financial transaction to obtain one or more rights to the original media object for commercial purposes. The original media object may only be accessible through completion of a commercial transaction, as, for example, when a photographic image owner prefers to store the full-scale, high-resolution image in a location inaccessible from the network.

A user of a content aggregation website, such as Yahoo! FLICKR™, may own and upload a photographic image with commercial value, using a second example standardized template that is referred to hereafter as a Yahoo! Social Media Advertisement ("Y!SocMedAd") bundle. The owner agrees that a second user has the right to aggregate the content as originally formulated alongside other works in a digest, provided that advertising relevant to the content is placed alongside other works in the digest, and that the owner receives a proportional share of 50% of the generated ad revenue. The user derives enhanced value from ad revenue and indirect revenue from further advertisement of availability of the user's work, whereas the gallery incorporator derives enhanced value from the aggregation website through ad revenue and indirect revenue from incentives for additional users.

A third example standardized template may be referred to as a "PayPerClick" bundle. A media object supplier may agree to supply access to a media object in return for payment based on the number of times the work, or a link attached to the work, is accessed. A manufacturer may desire to motivate an ad composer, for example, by paying in proportion to the number of follow-on consumer inquiries.

A content rights owner offers a media object for commercial consumption by first selecting a commercial template. A commercial rights offer includes identification of the owner of the media object rights, an identification of the media object, and an identification of the commerce template. For example, HTML source code for a web page could include the line:

<img src="http://www.mysite.com/beagle.jpg" alt="dog, hound" owner=bob123 bundle=Y!SocMedAd/>

In this example source code, an HTML image tag is augmented with two additional metadata fields, identifying the "owner" of the media object file as "bob123" and the associated commercial template "bundle" as the commerce template "Y!SocMedAd". The commerce tag facilitates combining the identified commerce bundle with required additional parameters. In this example, the commerce bundle requires identification of the owner and the media object. The owner is identified by supplying an owner-ID parameter for the commerce tag. Because the commerce tag is embedded in an image tag, a search engine may infer that the commerce bundle is associated with the image identified by the image tag, and located on the network by the image "src" field, identifying the URL where the image file is located.

The commerce tag provides an efficient, automated means for a rights owner to advertise one or more media objects commonly embedded in HTML or Java source code by insertion of a small number of additional metadata fields. The additional fields may be inserted by an explicit editing of page source code, or could be inserted through an automatic metadata field insertion process resulting from the application of a page template. The commerce system provider supplies one or more page templates, stored in commerce template database 304 and transmitted from server 302, in response to a database user query. A page owner is provided one-click commerce, in that the page template can be applied to modify the page source code with a single command. The commerce system may then discover the modified page source code through web-crawling, and add the owner's commercial offer to the database of commercial offers 305 in an automated process.

A commercial offer is completed by filling in missing terms (if any) in the template. In a simplified example, an agreement template may offer a free preview and unlimited use of a media object for a fixed price. The offer is completed by an owner associating the offer with a media object and filling in the missing price term. In a more realistic example, an agreement template may provide a free preview and contain a plurality of commercial offers concerning various combinations of rights in the media object. The user may combine various commercial offers by specifying additional commercial tags.

Figure 4:
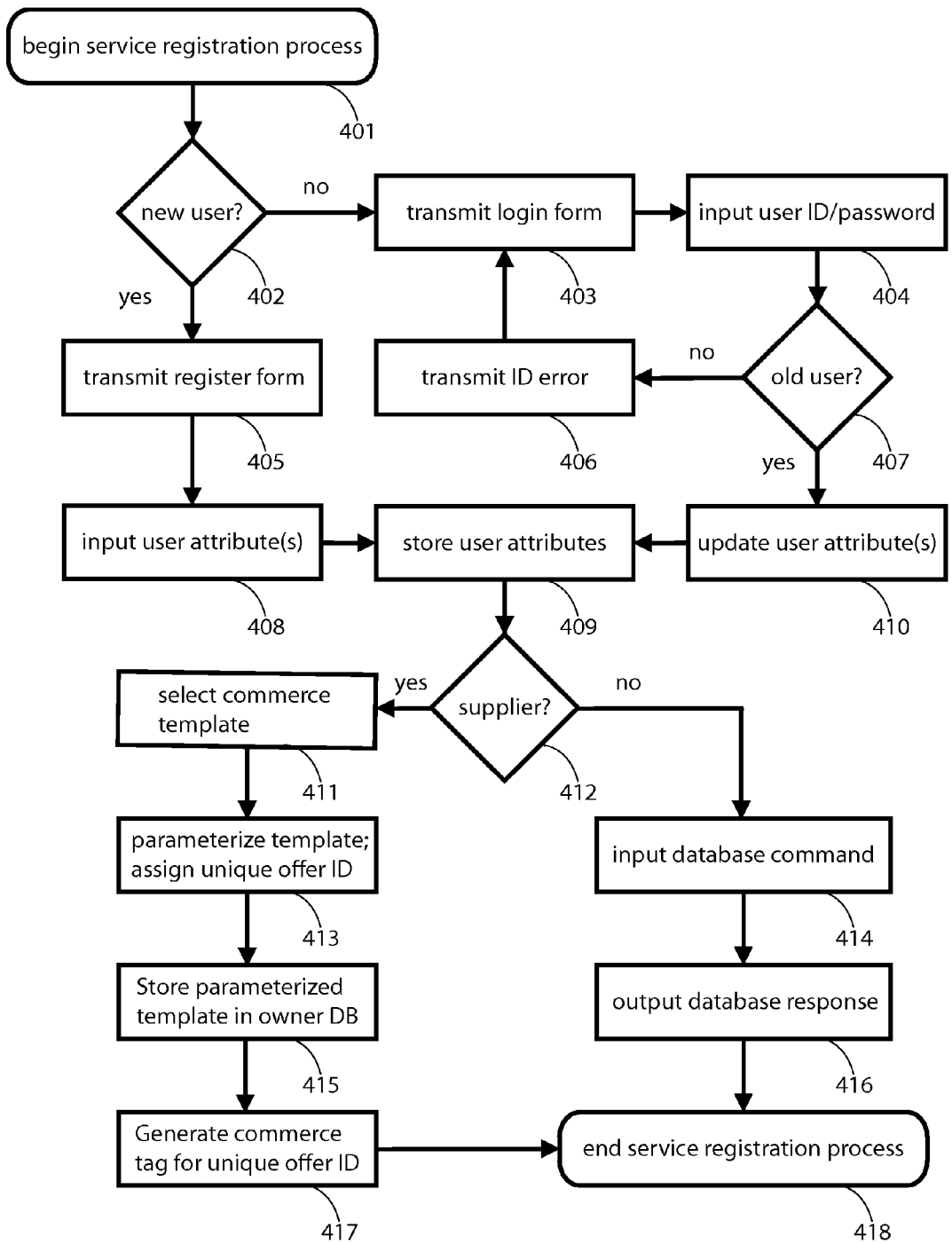
FIG. 4 is a flowchart for an example service process.

FIG. 4 is a flowchart representing an example service registration process consisting of a number of software steps. Components in a service-provider's registration server 302 execute computer-readable instructions to implement the software steps. A user may be classified as a new user, an identified old user, or an anonymous guest user. The registration process scans user input to determine whether a user accessing the server is a new user in step 402. For new users, the registration process scans entries on an online registration form, transmitted in step 405, to input, in step 408, and store, in step 409, one or more user attributes including a unique user identifier (ID) in the party database 303. Optionally, the registration server executes commands to incorporate a user password, user privileges and/or user preferences in the stored user attributes.

For guest and returning users, the flowchart proceeds from step 402 to step 403 to transmit a login form. A user fills in entries on the login form to identify and optionally to authenticate the user in step 404. The user identity and/or authentication are checked in step 407. If the user does not reside in the party registry 303 or provides an incorrect authentication, an error message is dynamically generated and transmitted to the user in step 406. The login form is retransmitted and the authentication process repeated until the returning user is authenticated in step 407 as an "old user". A user has the additional option of selecting "Guest" as user identification in step 404. A guest user is automatically authenticated for limited use of the system as an anonymous user. In either case, an authenticated user proceeds to step 410, where user attributes and privileges are retrieved from the party registry 303 and updated if necessary. The updated user attributes are re-stored in party registry 303 in step 409.

Once the user attributes have been established, the flowchart proceeds to step 412 to determine if the user is a media object supplier. If so, the flowchart proceeds to step 411, where the commerce system provider allows the supplier to browse the available commercial template bundles. A commercial bundle is a template in archetypal form which contains the actual commercial offer language, a commerce tag short-hand identifier for the commercial offer template, and an explanation of how to fill in any missing terms. Each commercial bundle is assigned a unique commercial bundle identifier. The commercial bundles are public documents, and may be freely downloaded. A user may store commercial templates and associated commerce tags for later manual editing and insertion, or may select a particular commercial bundle for further processing in step 413.

In step 413, a first commercial bundle may be parameterized to become nested in a second commercial bundle. For example, the user may select a first commercial bundle consisting of an un-parameterized Preview-Buy-Option bundle, and assigned to a unique bundle ID, "bundle=PreviewBuyOption". The user is prompted to fill in any missing terms. The commerce system nests the first bundle in a second user defined commercial bundle (in this example, by further defining an associated media object and a price) and the commerce system provider assigns a unique bundle ID, as for example, "bundle=bob123bundle449". The parameterized offer is stored in the owner registry 303 in step 415, assigned a unique commerce tag identifier and stored in the commerce offers database 305 in step 417.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method to facilitate electronic commerce in digital media objects comprising
   crawling a remote host system to index one or more resources hosted by the remote host system;
   responsive to detection of a commerce tag associated with a digital media object embedded in a resource of the one or more resources, accessing a registry of rights information to obtain one or more attributes of a license offer associated with the digital media object, wherein the commerce tag comprises a bundle tag identifying an archetypal media license offer from a plurality of archetypal media license offers and one or more parameter tags including data values corresponding to missing parameter values in the archetypal media license offer identified in the bundle tag, and wherein each of the archetypal media license offers corresponds to a set of predefined licensing terms;

storing, in a searchable database, a data locator for the digital media object in a search index in association with one or more attributes of the digital media object and the one or more attributes of the license offer associated with the digital media object including the bundle tag and the one or more parameter tags;

providing a query interface that facilitates searches for media objects based on one or more attributes of the digital media objects, and one or more license offer attributes.

2. The method of claim 1 further comprising responding to a query of the searchable database by identifying one or more media objects matching object and license terms identified in the query.

3. The method of claim 1 wherein one of the parameter tags is an identifier for a rights owner of the digital media object.

4. The method of claim 1 further comprising responsive to acceptance of a license offer associated with a digital media object, storing transaction information in a secure database.

5. A method to facilitate electronic commerce in digital media objects comprising maintaining a network accessible plurality of archetypal media object license offers, wherein each of the archetypal media license offers corresponds to a set of predefined licensing terms;

associating a media object license offer with a commerce tag;

associating a commerce tag with a network accessible media object, a media object rights owner, and a transaction service provider, wherein the commerce tag comprises a bundle tag identifying an archetypal media license offer from a plurality of archetypal media license offers and one or more parameter tags including data values corresponding to missing parameter values in the archetypal media license offer identified in the bundle tag;

maintaining a searchable database of media objects with associated commerce tags; and responding to a query of the searchable database by identifying one or more attributes of archetypal media object license offers, media object license offers, commerce tags, media object rights owners, transaction service providers, and/or media objects with associated commerce tags.

6. The method of claim 5, wherein the associating of a media object license offer with a commerce tag further comprises assigning a unique commerce tag to each unique media object license offer;

defining a network accessible standardized commerce tag format; and assigning a unique commerce tag identifier to each unique commerce tag.

7. The method of claim 5, wherein the associating of a commerce tag with a network accessible media object further comprises responding to a user query by providing a browser accessible textual reference of a plurality of prototypical commerce offers, each offer in the plurality associated with a commerce tag;

providing a user interface to select a prototypical offer in the plurality of prototypical commerce offers;

providing a user interface to enter additional terms to the selected prototypical offer;

dynamically generating a modified commerce offer, a unique identifier for the modified commerce offer and unique commerce tag for the modified commerce offer;

registering the modified commerce offer in a commerce offers database; and providing a means to configure and embed the modified commerce tag as metadata in a data object describing the network accessible media object.

8. The method of claim 7, wherein the providing a means to configuring and embedding is by transmitting a web page template.

9. The method of claim 7, wherein the providing a means to configure and embed the modified commerce tag is by transmission of the modified commerce tag and a usage and embedding reference manual.

10. The method of claim 5, wherein the associating of a commerce tag with a network accessible media object further comprises transmitting a plurality of prototypical commerce tags on a commerce system provider web page;

providing a user interface to select a prototypical commerce tag from the plurality of prototypical commerce tags;

providing a user interface to configure the prototypical commerce tag to identify required parameters in a modified commerce tag, including a network location of the network accessible media object; and storing the modified commerce tag as an additional commerce tag in a commerce system provider database.

11. The method of claim 5, wherein the associating of a commerce tag with a media object rights owner further comprises transmitting a media object rights owner registration web page for a remote host on a commerce system provider;

responsive to owner input, registering the media object rights owner with the commerce system provider;

storing attributes of the media object rights owner in a party registry database;

assigning a unique owner identifier to each unique media object rights owner; and transmitting the unique owner identifier as an owner tag to be embedded in a commerce tag.

12. The method of claim 5, wherein the associating of a commerce tag with a transaction service provider further comprises registering the transaction service provider with a commerce system provider;

storing attributes of the transaction service provider in a commerce system provider database;

assigning a unique transaction service provider identifier to each unique transaction service provider;

embedding the transaction service provider identifier as a parameter in the commerce tag; and responding to transaction service provider queries of the commerce system provider databases.

13. An apparatus to facilitate electronic commerce in digital media objects comprising a commerce system provider server system, including a datastore of attributes of media object rights owners;
a datastore of attributes of archetypal media object license offers;
a datastore of attributes of parameterized media object license offers; and
a datastore of attributes of commerce system service providers;

said apparatus operative to
maintain a network accessible plurality of archetypal media object license offers, wherein each of the archetypal media license offers corresponds to a set of predefined licensing terms;
associate a media object license offer with a commerce tag;
associate a commerce tag with a network accessible media object, a media object rights owner, and a transaction service provider, wherein the commerce tag comprises a bundle tag identifying an archetypal media license offer from a plurality of archetypal media license offers and one or more parameter tags including data values corresponding to missing parameter values in the archetypal media license offer identified in the bundle tag;
maintain a searchable database of media objects with associated commerce tags; and
respond to a query of the searchable database by identifying one or more attributes of archetypal media object license offers, media object license offers, commerce tags, media object rights owners, transaction service providers, and/or media objects with associated commerce tags.

14. The apparatus of claim 13, wherein the operation to associate a media object license offer with a commerce tag further comprises
assigning a unique commerce tag to each unique media object license offer;
defining a network accessible standardized commerce tag format; and
assigning a unique commerce tag identifier to each unique commerce tag.

15. The apparatus of claim 13, wherein the operation to associate a commerce tag with a network accessible media object further comprises
providing a browser accessible textual reference of a plurality of prototypical commerce offers, each offer in the plurality associated with a commerce tag;
providing a user interface to select a prototypical offer in the plurality of prototypical commerce offers;
providing a user interface to enter additional terms to the selected prototypical offer;
dynamically generating a modified commerce offer, a unique identifier for the modified commerce offer and unique commerce tag for the modified commerce offer;
registering the modified commerce offer in a commerce offers database; and
providing a means to configure and embed the modified commerce tag as metadata in a data object describing the network accessible media object.

16. The apparatus of claim 15, wherein the providing a means to configuring and embedding is by transmitting a web page template.

17. The apparatus of claim 15, wherein the providing a means to configure and embed the modified commerce tag is by transmission of the modified commerce tag and a usage and embedding reference manual.

18. The apparatus of claim 13, wherein the operation to associate a commerce tag with a network accessible media object further comprises transmitting a plurality of prototypical commerce tags on a commerce system provider web page;
providing a user interface to select a prototypical commerce tag from the plurality of prototypical commerce tags;
providing a user interface to configure the prototypical commerce tag to identify required parameters in a modified commerce tag, including a network location of the network accessible media object; and
storing the modified commerce tag as an additional commerce tag in a commerce system provider database.

19. The apparatus of claim 13, wherein the operation to associate a commerce tag with a media object rights owner further comprises
registering the media object rights owner with a commerce system provider;
storing attributes of the media object rights owner in a party registry database;
assigning a unique owner identifier to each unique media object rights owner; and
embedding the unique owner identifier as a parameter in the commerce tag.

20. The apparatus of claim 13, wherein the operation to associate a commerce tag with a transaction service provider further comprises
registering the transaction service provider with a commerce system provider;
storing attributes of the transaction service provider in a commerce system provider database;
assigning a unique transaction service provider identifier to each unique transaction service provider;
embedding the transaction service provider identifier as a parameter in the commerce tag; and
responding to transaction service provider queries of the commerce system provider databases.

21. A memory for storing an index of commercially available network accessible media objects comprising:
a datastore of attributes of media object rights owners;
a datastore of attributes of archetypal media object license offers, wherein each of the archetypal media license offers corresponds to a set of predefined licensing terms;
a datastore of attributes of parameterized media object license offers, each parameterized media object license offer comprising a bundle tag identifying an archetypal media license offer from a plurality of archetypal media license offers and one or more parameter tags including data values corresponding to missing parameter values in the archetypal media license offer identified in the bundle tag; and
a datastore of attributes of commerce system service providers.

22. The memory of claim 21, wherein the attributes of a media object rights owner include a unique owner identifier and one or more of an owner password, an identifier of a media object supplied by the media objects rights owner, a network locater of the media object, a brief description of the media object, and an identifier of a remuneration receiver willing to receive media object licensing fees for the owner.

23. The memory of claim 21, wherein the attributes of an archetypal media object license offer include a unique identifier for the archetypal media object license offer, and one or more of the textual contract language associated with the archetypal media object license offer, a standardized commerce tag format associated with the archetypal media object license offer, and an identifier for a transaction service provider willing to accept license fees from a consumer of the media object.

24. The memory of claim 21, wherein the attributes of a parameterized media object license offer include a unique identifier for the parameterized media object license offer, a media object rights owner, and one of more of an identifier of a media object supplied by the media objects rights owner, a network location of the media object, a brief description of the media object, a digital signature of the media object, and an identifier for a transaction service provider willing to accept license fees from a consumer of the media object.

* * * * *